(12) United States Patent
Chang et al.

(10) Patent No.: US 8,530,532 B2
(45) Date of Patent: Sep. 10, 2013

(54) HYDROGEL CONTACT LENSES HAVING IMPROVED WETTABILITY

(75) Inventors: Tae Sun Chang, Daejeon (KR); Hyung Rok Kim, Daejeon (KR); Kyoung Hee Yun, Cheonan-si (KR)

(73) Assignees: Korea Research Institute of Chemical Technology, Daejeon (KR); Interojo Inc., Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 13/139,155

(22) PCT Filed: Apr. 27, 2009

(86) PCT No.: PCT/KR2009/002193
§ 371 (c)(1),
(2), (4) Date: Jun. 10, 2011

(87) PCT Pub. No.: WO2010/076923
PCT Pub. Date: Jul. 8, 2010

(65) Prior Publication Data
US 2011/0245358 A1   Oct. 6, 2011

(30) Foreign Application Priority Data

Dec. 31, 2008   (KR) .................. 10-2008-0138043

(51) Int. Cl.
*G02C 7/04* (2006.01)

(52) U.S. Cl.
USPC .............. 521/55; 521/182; 521/154; 521/183

(58) Field of Classification Search
USPC ................ 523/106; 527/314; 521/55, 182, 521/154, 183
See application file for complete search history.

(56) References Cited

U.S. PATENT DOCUMENTS

| | | | | |
|---|---|---|---|---|
| 4,365,050 A | * | 12/1982 | Ivani | 527/312 |
| 4,447,562 A | * | 5/1984 | Ivani | 514/772.5 |
| 4,820,352 A | * | 4/1989 | Riedhammer et al. | 134/30 |
| 5,034,461 A | * | 7/1991 | Lai et al. | 525/100 |
| 5,528,322 A | * | 6/1996 | Jinkerson | 351/159.62 |
| 7,977,296 B2 | * | 7/2011 | Oldenhove et al. | 510/235 |
| 2004/0044099 A1 | * | 3/2004 | Tucker et al. | 523/160 |
| 2005/0075453 A1 | * | 4/2005 | Mathauer et al. | 524/801 |

FOREIGN PATENT DOCUMENTS

| | | |
|---|---|---|
| CN | 1100110 | 3/1995 |
| EP | 0620455 | 10/1994 |
| EP | 620455 A2 * | 10/1994 |
| JP | 2008-230973 | 10/2008 |
| KR | 10-2001-0077222 | 8/2001 |
| WO | 2006/009101 | 1/2006 |
| WO | 2006/039466 | 4/2006 |

OTHER PUBLICATIONS

TDS 524 Glucam E-20, Aug. 1, 2005.*
International Preliminary Report on Patentability for international application No. PCT/KR2009/002193 dated May 23, 2011.
Myoung-Hea Kim et al., The Difference of the Cleaning and Wettability-maintaining Efficacy of Lens Care Solution to RGP Lens, Journal of Korean Oph. Opt. Soc., vol. 11, No. 1, pp. 27-34, Jan. 2006.
International Search Report mailed Oct. 9, 2009 for PCT/KR2009/002193.

* cited by examiner

*Primary Examiner* — James J Seidleck
*Assistant Examiner* — Peter A Salamon
(74) *Attorney, Agent, or Firm* — Lower Hauptman & Ham, LLP

(57) ABSTRACT

The present invention relates to a hydrogel contact lens having improved wettability, and particularly to a hydrogel contact lens of a complex membrane having an IPN (interpenetrating polymer network) intra structure, which is prepared by crosslinking composition for a contact lens comprising, as a main ingredient, an acryl monomer and an oligosaccharide and optionally a silicone compound. Due to the presence of an oligosaccharide in a contact lens herein, tensile strength and wettability can be maximized to provide a superior wearing feeling and maintain wettability even after a long-term storage in a care solution such as a washing solution, a storage solution and a protein-removing solution.

14 Claims, 2 Drawing Sheets

HYDROGEL CONTACT LENSES HAVING IMPROVED WETTABILITY

CROSS REFERENCE TO RELATED APPLICATION

This application claims the priority of Korean Patent Application No. 10-2008-0138043, filed on Dec. 31, 2008, in the KIPO (Korean Intellectual Property Office), the disclosure of which is incorporated herein in their entirety by reference. Further, this application is the National Phase application of International Application No. PCT/KR2009/002193, filed Apr. 27, 2009, which designates the United States and was published in English. Each of these applications is hereby incorporated by reference in their entirety into the present application.

TECHNICAL FIELD

The present invention relates to a hydrogel contact lens having improved wettability, and particularly to a hydrogel contact lens of a complex membrane having an IPN (interpenetrating polymer network) intra structure, which is prepared by crosslinking a composition for a contact lens comprising, as main ingredients, an acryl monomer and an oligosaccharide and optionally a silicone compound. Due to the presence of an oligosaccharide in a contact lens herein, tensile strength and wettability can be maximized to provide a superior wearing feeling and maintain wettability even after a long-term storage in a care solution such as a washing solution, a storage solution and a protein-removing solution.

BACKGROUND ART

Short-distance working using a book or a computer are increasing in the 21th century, which is defined as digital and information-orientation after industrialization, thereby threatening the health of eyes. A hydrogel material that is most widely used for a contact lens is a polymer forming a network structure where monomers are bound to each other by a crosslinking agent. A hydrogel used for a contact lens for the first time is poly(2-hydroxyethylmethacrylate (poly-HEMA, often referred to as HEMA), developed in 1960's by Wichterle. PolyHEMA is a homopolymer where hydroxyethylmethacrylate monomers are bound to each other in the simplest manner by a crosslinking agent (EGDMA). Poly-HEMA is the most widely used for a contact lens for the following reasons: it has a very soft structure and is stable during pH and temperature changes; and a contact lens can be easily prepared by using polyHEMA. However, wearing polyHEMA for a long period of time can cause inconveniences such as corneal edema, congestion and an ache due to a relatively low wettability. Therefore, new products need to be developed to overcome the wettability of polyHEMA. A silicone-rubber-based lens has also been used for the past few years for the therapeutical and pediatric purposes. Despite the superiority in wettability and durability, however, a silicone-rubber lens has various clinical drawbacks. For example, a lens often sticks to an eyeball because tears may not flow through the lens and an extremely high hydrophobicity of a lens frequently induces deposit of lipids on the surface of an eyeball. A silicone hydrogel material is prepared by using a silicone monomer and a hydrogel monomer, and is developed to overcome the drawbacks of a silicone-rubber lens. A silicone ingredient provides a high degree of oxygen permeation, and a hydrogel ingredient increases flexibility, solubility and tear transportation, and therefore promotes the movement of a lens. However, a silicone hydrogel is prepared by using a combination of two different monomers which have heterogeneous properties, i.e., a silicone and a hydrogel monomer, thus requiring a technique for appropriately mixing the two different monomers. Examples of a commercially available silicone-hydrogel lens are Focus Night & Day by CIBA Vision's, PureVision by Bausch & Lomb's and Acuvue Advance by Vistakon's. The Night & Day and the Purevision are approved for an overnight use, and the Acuvue Advance is approved only for a daily use.

It has been reported that the commercially available silicone-hydrogel lens needs to be improved regarding wettability, and there have been attempts made to improve wettability of a lens by modifying the surface of a lens. International patent publication No. WO 06/039466 discloses a process of preparing a silicone hydrogel lens by using various hydrophilic polymers such as polyamide-based, polylactone-based, polyimide-based, or polylactam-based polymers as an internal wetting agent. However, it discloses no wetting effect in a clinic respect, and an internal wetting agent contained in an amount of several percent to several tens of a percent is reported as deteriorating intrinsic properties required in a contact lens.

Further, there have been attempts made to develop a lens care solution for maintaining water content in a silicone hydrogel contact lens. WO 06/009101 discloses a process of preparing a solution comprising polyvinylalcohol (PVA), cellulose and squalene as main ingredients for avoiding the evaporation of moisture. However, it is not effective because the maintenance of moisture varies depending on the hydrophilic functional groups on the surface of a contact lens. *Journal of Korean Oph. Opt. Soc.* 11, 27 (2006) prepares a lens care solution as a way to maintain wettability of a lens, and compares the resulting contact angles between thus prepared solution and a commercially purchased care solution. Wettability varies depending on the material used for preparing a lens and the type of a care solution. U.S. Pat. No. 4,820,352 discloses a composition comprising a surfactant and sorbic acid as a preserving solution for supplementing wettability of a contact lens. However, it has been reported that this technique can irritate the eyes of a lens wearer and decrease the durability of a lens. Korean patent publication No. 2001-007722 discloses a multi-purpose lens care solution for the purpose of a protein-removing solution, a washing solution and a lens care solution, which comprises a polysaccharide with a molecular weight of 5,000 or higher, non-ionic surfactants and collagen derivatives as main ingredients. The increase in wettability is temporary because it is not the increase achieved by the change in elemental component in a lens.

The present invention has been achieved as a result of attempts made to overcome all the aforementioned problems. That is, wetting properties of a contact lens is increased by the polymerization of an appropriate material in the present invention instead of the surface modification or a lens care solution. The present invention has been completed by finding that a relatively high degree of water content can be maintained for a long period of time by using a contact lens herein.

DISCLOSURE OF INVENTION

Technical Problem

The present invention aims to provide a composition for a contact lens that can improve both wetting properties and mechanical properties such as tensile strength in a lens.

The present invention also aims to provide a contact lens that can maintain a high-level of oxygen content for a long period of time without causing an ophthalmologic disease such as xerophthalmia or corneal edema.

The present invention also aims to provide a contact lens herein that can maintain wettability even after a long-term storage in a care solution such as a washing solution, a storage solution or a protein-removing solution.

Technical Solution

The present invention discloses a composition for a contact lens comprising (a) an acryl monomer 30-99.99 wt %; and (b) an oligosaccharide 0.01-70 wt %.

The present invention also discloses a composition for a contact lens comprising (a) an acryl monomer 30-99.98 wt %; (b) an oligosaccharide 0.01-20 wt %; and (c) a silicone compound 0.01-50 wt %.

The present invention also discloses a hydrogel contact lens which is a complex membrane prepared by crosslinking a composition of the present invention.

The present invention also discloses a hydrogel contact lens which is a complex membrane having an IPN intra structure, a tensile strength of 3-15 kg/cm$^2$, a water content of 30-75%, a wetting angle of 40-150° and an elasticity of 0.3-1.6 MPa.

Advantageous Effects

A hydrogel contact lens herein is a complex membrane having an IPN intra structure, and feels good to wear for a long period of time, while showing little chance in causing an ophthalmologic disease such as xerophthalmia or corneal edema due to the superiority in various properties such as tensile strength, water content, wetting angle and elasticity.

A contact lens herein is prepared by crosslinking a composition comprising both an acryl monomer and an oligosaccharide as essential ingredients, and thus does not physically deteriorate in a washing solution, a care solution or storage solution.

BEST MODE FOR CARRYING OUT THE INVENTION

Figure 1:
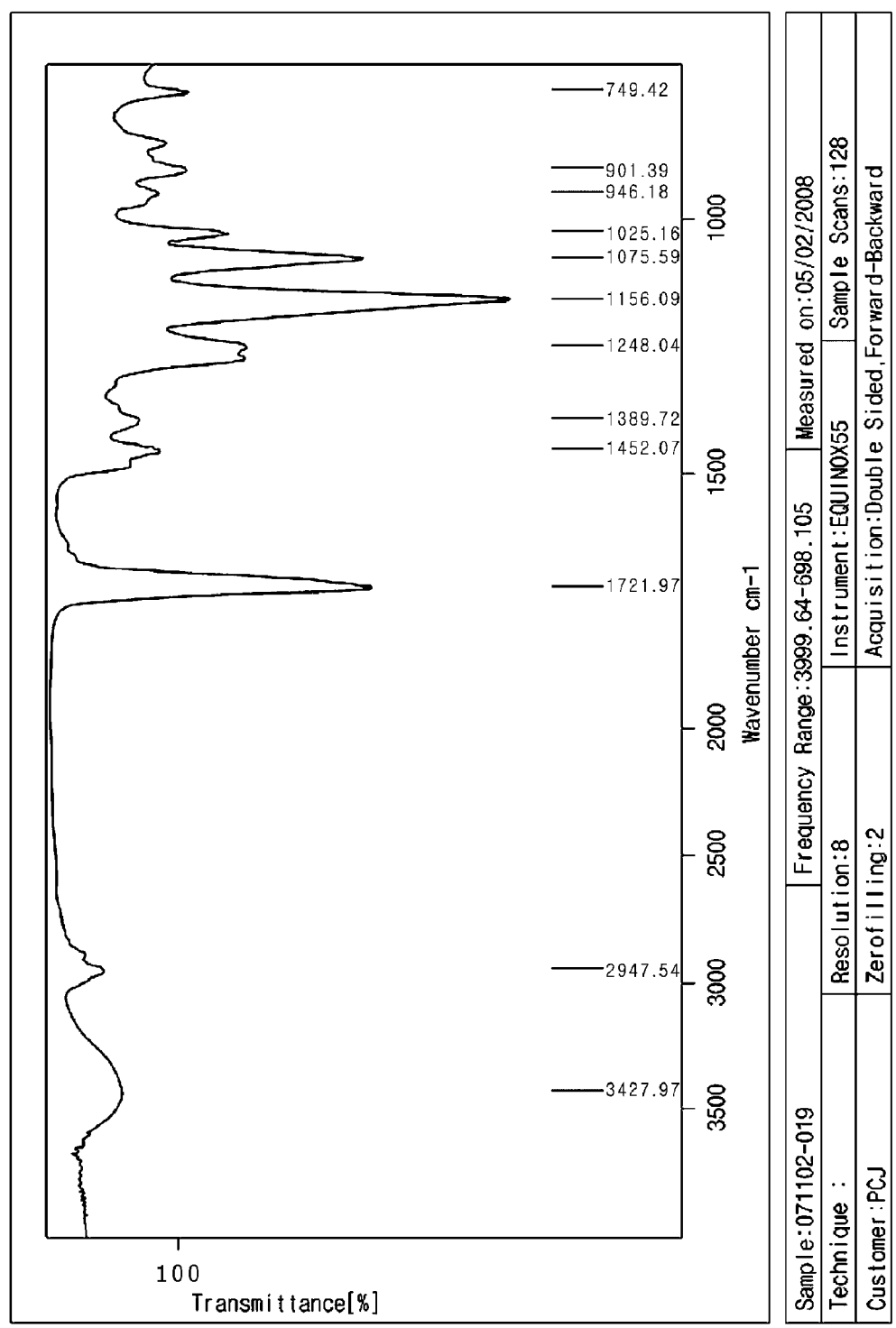
FIG. 1 is an IR spectrum of a contact lens prepared in Comparative Example 2.

A composition for a contact lens disclosed in the present invention comprises an acryl monomer and an oligosaccharide as essential ingredients.

An oligosaccharide is a biocompatible organic material useful for an eyeball and is crosslinked with an acryl monomer, thus forming a complex membrane having an IPN infra-structure. Pores are present in an IPN infra-structure, and gas or liquid can moves through these pores. Various properties required for a contact lens such as water content largely vary depending on the size and the distribution of pores in an IPN intra-structure of a complex membrane. In the present invention, an oligosaccharide is used as an essential ingredient for controlling the size of pores in an IPN infra-structure. In particular, both the control of humidity in eyes and the improvement in tensile strength of a lens can be achieved by modifying the infra-structure in such a manner that a lens can easily bind with water and that oxygen content and permeability can be increased.

An oligosaccharide is an oligomer comprising 2-1,000 monomers, preferably 5-500 monomers, which are bound to each other via a glycoside bond. An oligosaccharide can be natural oligosaccharides present in plants or synthetic oligosaccharides prepared by partially decomposing polysaccharides. Most natural oligosaccharides are disaccharides such as sucrose, maltose and lactose; and glycoproteins and glycolipids also comprise oligosaccharides. Further, an oligosaccharide with a controlled viscosity can be prepared by either a chemical or a physical cleavage method. As a chemical method, a molecular structure of polysaccharides (e.g., starch, cellulose, glycogen, chitin, pectin, chondroitin sulfate, algin, carrageenan and glycosaminoglycan can be decomposed, for example, either by hydrolysis using an appropriate acid and alkali, or by an ozone ($O_3$) treatment. Various known methods can be used in the present invention without limitation for decomposing molecular structure of polysaccharides. Examples of an oligosaccharide herein include without limitation sucrose oligosaccharide, maltose oligosaccharide, lactose oligosaccharide, glucose oligosaccharide, glucosamine oligosaccharide, N-acetylglucosamine oligosaccharide, glucopyranoside oligosaccharide, glucosaminoglycan oligosaccharide (e.g., chondroitin or its salt, dermatan or its salt, keratan or its salt, heparan or its salt, hyaluronan and heparin), galacturonic acid oligosaccharide, cellobiose oligosaccharide and algin oligosaccharide.

Although an oligosaccharide can sufficiently improve the wettability of a lens, an oligosaccharide herein can be substituted with a hydrophilic group by an ion exchange for maximizing the wettability. The ratio of hydrophilic substitution can be 5-100 wt %, preferably 20-100 wt % relative to the total weight of an oligosaccharide. Examples of a hydrophilic group include without limitation hydroxy (—OH), carboxylic acid (—COOH), carboxylate (—COOK, R=$C_{1-6}$ alkyl), ketone (—CO—), aldehyde (—COH), amide (—NHCO—), alkanoate (RCOO—, R=$C_{1-6}$ alkyl) and hydroxymethyl (—CH$_2$OH) groups.

Viscosity of an oligosaccharide can vary depending on the number of monomers. An oligosaccharide herein has a viscosity of 30-20,000 cP, preferably 100-10,000 cP. When a viscosity of an oligosaccharide is lower than 30 cP, water-retaining properties can be deteriorated due to the decrease in molecular weight. When a viscosity is higher than 20,000 cP, monomers may not be sufficiently mixed and foams may be formed, thus deteriorating product quality. Therefore, a viscosity of an oligosaccharide is an important factor in controlling the wettability of a lens.

Hereunder is provided a detailed description of ingredients of a composition for a contact lens herein and a process of preparing a contact lens.

A composition for a contact lens herein comprises an acryl monomer and an oligosaccharide as essential ingredients.

An acryl monomer herein can be selected from the group consisting of acrylic acid; methacrylic acid; acrylamide; $C_1$-$C_{15}$ saturated or unsaturated alkyl acrylate or methacrylate; $C_1$-$C_{15}$ hydroxyalkyl acrylate or methacrylate comprising 1-3 substituted hydroxylalkyl groups; N,N-di($C_1$-$C_{15}$ saturated or unsaturated alkyl)acrylamide and mixtures thereof. In particular, an acryl monomer herein can be selected from the group consisting of acrylic acid (AA), methacrylic acid (MA), acrylamide, lauryl methacrylate (LMA), hydroxyethylmethacrylate (HEMA), glycerol monomethacrylate (GMMA), N,N-dimethylacrylamide (DMA) and mixtures thereof.

Moreover, for improving hydrophilicity of a contact lens, an acryl monomer can be partially replaced with a hydrophilic monomer selected from the group consisting of N-vinylpyrrolidone (NVP) and N-methylpyrrolidone (NMP). The hydrophilic monomer can be used in an amount of 0-50 wt %, preferably 10-30 wt %. When an amount of a hydrophilic monomer that replaces an acryl monomer is higher than 50 wt %, a tensile strength can be deteriorated.

An acryl monomer 30-99.99 wt % and an oligosaccharide 0.01-70 wt %, preferably an acryl monomer 40-99.99 wt % and an oligosaccharide 0.01-60 wt %, can be contained in a composition for a contact lens comprising an acryl monomer and an oligosaccharide as essential ingredients. When the amount of an acryl monomer is less than the aforementioned range or the amount of an oligosaccharide is too high, a complex membrane prepared by a crosslinking can be brittle. In contrast, when the amount of an acryl monomer is too high or the amount of an oligosaccharide is too low, it is difficult to form an IPN intra structure with a controlled size of pore and to improve both tensile strength and wettability of a lens.

Moreover, a composition for a contact lens herein can further comprise a silicone compound for improving the wettability of a lens. A silicone compound is a hydrocarbon compound comprising silicon (Si) atoms, and a silicon (Si) atom of a silicone compound herein can be substituted or unsubstituted with hydroxy, $C_1$-$C_{10}$ alkoxy, amide, ester or siloxy group. Examples of a silicone compound herein include without limitation 2-(trimethylsilyloxy)ethyl methacrylate, tris(3-methacryloxypropyl)silane, 3-tris(trimethylsiloxy)silyl propyl methacrylate and 4-methacryloxybutyl-terminated polydimethylsiloxane.

An acryl monomer 30-99.98 wt %, an oligosaccharide 0.01-20 wt % and a silicone compound 0.01-50 wt %, preferably an acryl monomer 40-94.9 wt %, an oligosaccharide 0.1-15 wt % and a silicone compound 5-45 wt % can be contained in a composition for a contact lens comprising an acryl monomer, an oligosaccharide and a silicone compound as an essential ingredient. When a silicone compound content is less than the aforementioned amount, the effect of improving wettability is insignificant, when the silicone compound content is too much, a lens can be brittle due to the increase in hardness while tensile strength and wettability drastically decrease. Therefore, a silicone compound used for improving the elasticity of a contact lens should be contained in an appropriate amount to prepare a contact lens with sufficient tensile strength and wettability.

A contact lens having a shape of a complex membrane is prepared by using a composition herein by conducting polymerization as usually done.

A crosslinking agent such as azodiisobutyronitrile (AIBN), benzoyl peroxide and 2,5-dimethyl-2,5-di(2-ethylhexanoylperoxy)hexane is added to the composition herein, and crosslinking is carried out with stirring at a temperature of between room temperature and 200° C., followed by molding into a membrane with a thickness of 0.04-2.0 mm, thus providing a contact lens. Wettability of a contact lens herein can be improved by controlling the degree of crosslinking, i.e. the molecular weight of a polymer.

Thus prepared contact lens herein is a thin transparent cured membrane having an IPN intra structure. Hydrophilic functional groups from an oligosaccharide are present in the intra structure or on the outer surface of thus prepared membrane, chemically adsorb water and thus controls contact angle of a contact lens.

Thus prepared contact lenses have a tensile strength of 3-15 $kg/cm^2$, a water content of 38-65%, a wetting angle of 40-150° and an elasticity of 0.3-1.6 MPa.

A contact lens herein shows relatively high oxygen permeability, and maintains a high-level of oxygen content even after wearing the contact lens for tens of days without causing an ophthalmologic disease such as xerophthalmia or corneal edema.

EXAMPLES

The present invention will be described based on the following Examples. However, the present invention is not limited by the following Examples.

Comparative Examples 1-3 and Examples 1-9

Various kinds of compositions for contact lens were prepared by using an acryl monomer alone (Comparative Examples 1-3) and both an acryl monomer and an oligosaccharide (Examples 1-9) as shown in Table 1. The composition (100 g) was added with azodiisobutyronitrile (0.4 g) as a crosslinking agent, and stirred to give a monomer mixture. Thermal polymerization was conducted in a mold with a shape of a contact lens.

Comparative Examples 4-5 and Examples 10-18

Various kinds of compositions for contact lens were prepared by using an acryl monomer and an silicone compound (Comparative Examples 4-5) and an acryl monomer, an oligosaccharide and a silicone compound (Acrymer™-SiHy843, an effect ingredient; silicone acrylate) (Examples 10-18) as shown in Table 1. The composition 100 g was added with azodiisobutyronitrile (0.4 g) as a crosslinking agent, and stirred to give a monomer mixture. Thermal polymerization was conducted in a mold with a shape of a contact lens.

Abbreviated names of monomers used in Examples and Comparative Examples are as follows.
HEMA: hydroxyethylmethacrylate
GMMA: glycerol monomethacrylate
MA: methacrylic acid
DMA: N,N-dimethylacrylamide
NVP: N-vinylpyrrolidone Test Example Evaluation of Properties of a Contact Lens Properties of a contact lens, which prepared in Comparative Examples 1-5 and the Examples 1-18, and a commercial contact lens product were tested, and the results are provided in Table 1.
Test Method
1) Tensile strength was measured according to JIS K7113: 1995.
2) Water content was measured according to ISO18369-4: 2006.
3) Wetting angle (°) was measured using DSA100 according to captive bubble measurement.
4) Elasticity (MPa) was measured by a method for Young's modulus.

TABLE 1

| Category | Composition for contact lens | | | Properties of contact lens | | | |
|---|---|---|---|---|---|---|---|
| | monomer (amount used) | oligosaccharide (viscosity) (amount used) | silicone compound (amount used) | tensile strength (kg/cm$^2$) | water content (%) | wetting angle (°) | elasticity (MPa) |
| Comp Ex 1 | HEMA (100 g) | — | — | 4.4 | 38 | 42 | 1.2 |
| Comp Ex 2 | HEMA (80 g) GMMA (20 g) | — | — | 5.6 | 49 | 80 | 0.9 |
| Comp Ex 3 | HEMA (98 g) MA (2 g) | — | — | 4.6 | 45 | 65 | 1.1 |
| Comp Ex 4 | HEMA (98 g) DMA (1 g) | — | acrymer (1 g) | 3.6 | 40 | 44 | 1.4 |
| Comp Ex 5 | NVP (28 g) DMA (28 g) | — | acrymer (44 g) | 3.1 | 52 | 62 | 0.8 |
| Ex 1 | HEMA (69.99 g) GMMA (30 g) | glucosamine (100 cP) (1 g) | — | 6.0 | 55 | 104 | 0.7 |
| Ex 2 | HEMA (69.99 g) GMMA (30 g) | glucosamine (1000 cP) (0.01g) | — | 6.1 | 55 | 112 | 0.6 |
| Ex 3 | HEMA (99.9 g) | glucosamine (2000 cP) (0.1 g) | — | 6.5 | 56 | 100 | 0.7 |
| Ex 4 | HEMA (79.8 g) GMMA (20 g) | glucosamine (3000 cP) (0.2 g) | — | 8.3 | 58 | 115 | 0.6 |
| Ex 5 | HEMA (97 g) MA (2 g) | glucosamine (5000 cP) (1 g) | — | 9.0 | 55 | 105 | 0.8 |
| Ex 6 | HEMA (68 g) GMMA (25 g) NVP (5 g) | glucosamine (8000 cP) (2 g) | — | 9.5 | 55 | 128 | 0.4 |
| Ex 7 | HEMA (80 g) GMMA (20 g) | chondroitin (1000 cP) (0.01g) | — | 6.1 | 55 | 112 | 0.6 |
| Ex 8 | HEMA (80 g) GMMA (20 g) | hyaluronan (1000 cP) (0.01 g) | — | 6.5 | 56 | 115 | 0.5 |
| Ex 9 | HEMA (80 g) GMMA (20 g) | alginic acid (1000 cP) (0.01 g) | — | 6.2 | 58 | 109 | 0.5 |
| Ex 10 | HEMA (69.8 g) DMA (15 g) | glucopyranoside (100 cP) (1 g) | acrymer (15 g) | 6.0 | 55 | 100 | 0.6 |
| Ex 11 | HEMA(69.8 g) DMA (15 g) | glucopyranoside (1000 cP) (0.2 g) | acrymer (15 g) | 6.0 | 58 | 95 | 0.6 |
| Ex 12 | HEMA (11.2 g) NVP (22 g) DMA (29 g) | glucopyranoside (2000 cP) (0.8 g) | acrymer (37 g) | 6.6 | 52 | 88 | 0.6 |
| Ex 13 | NVP (10 g) DMA (44 g) | glucopyranoside (3000 cP) (2 g) | acrymer (44 g) | 6.8 | 55 | 110 | 0.4 |
| Ex 14 | HEMA (32 g) DMA (32 g) | glucopyranoside (5000 cP) (6 g) | acrymer (30 g) | 7.0 | 55 | 105 | 0.5 |
| Ex 15 | HEMA (50 g) DMA (13 g) NVP (17 g) | glucopyranoside (8000 cP) (13 g) | acrymer (7 g) | 6.5 | 55 | 98 | 1.2 |
| Ex 16 | HEMA (80 g) GMMA (20 g) | chondroitin (1000 cP) (0.01 g) | acrymer (1 g) | 7.2 | 58 | 98 | 0.6 |
| Ex 17 | HEMA (80 g) GMMA (20 g) | hyaluronan (1000 cP) (0.01 g) | acrymer (44 g) | 7.5 | 59 | 105 | 0.7 |
| Ex 18 | HEMA (80 g) GMMA (20 g) | alginic acid (1000 cP) (0.01 g) | acrymer (44 g) | 6.9 | 60 | 111 | 0.8 |
| Commercial Product | | Night & Day | | — | 24 | 67 | 1.4 |
| | | PureVision | | — | 36 | 99 | 1.0 |
| | | Acuvue Advance | | — | 46 | 107 | 0.4 |

Table 1 shows that Examples drawn to a composition comprising an oligosaccharide are higher than Comparative Example drawn to a composition does not comprise an oligosaccharide in both tensile strength and wettability. Specifically, a contact lens comprising both an acryl monomer and oligosaccharide (Examples 1-9) is higher than a contact lens comprising only an acryl monomer (Comparative Examples 1-3) in both tensile strength and wettability. A contact lens comprising an acryl monomer, a silicone compound and an oligosaccharide (Examples 10-18) is also higher than a contact lens comprising only an acryl monomer and a silicone compound (Comparative Examples 4-5) in tensile strength and wettability.

Moreover, a contact lens composition further comprising a silicone compound (Examples 10-18) is slightly higher in elasticity and slightly lower in tensile strength and wettability than a contact lens comprising no silicone compound (Examples 1-9). A composition of Examples 10-18 is still sufficient for material of a contact lens having improved wettability as desired in the present invention. Therefore, depending on the use of a contact lens, a particular amount of a silicone compound can be further contained in a contact lens composition, thereby improving elasticity, tensile strength and wettability in a contact lens.

Figure 2:
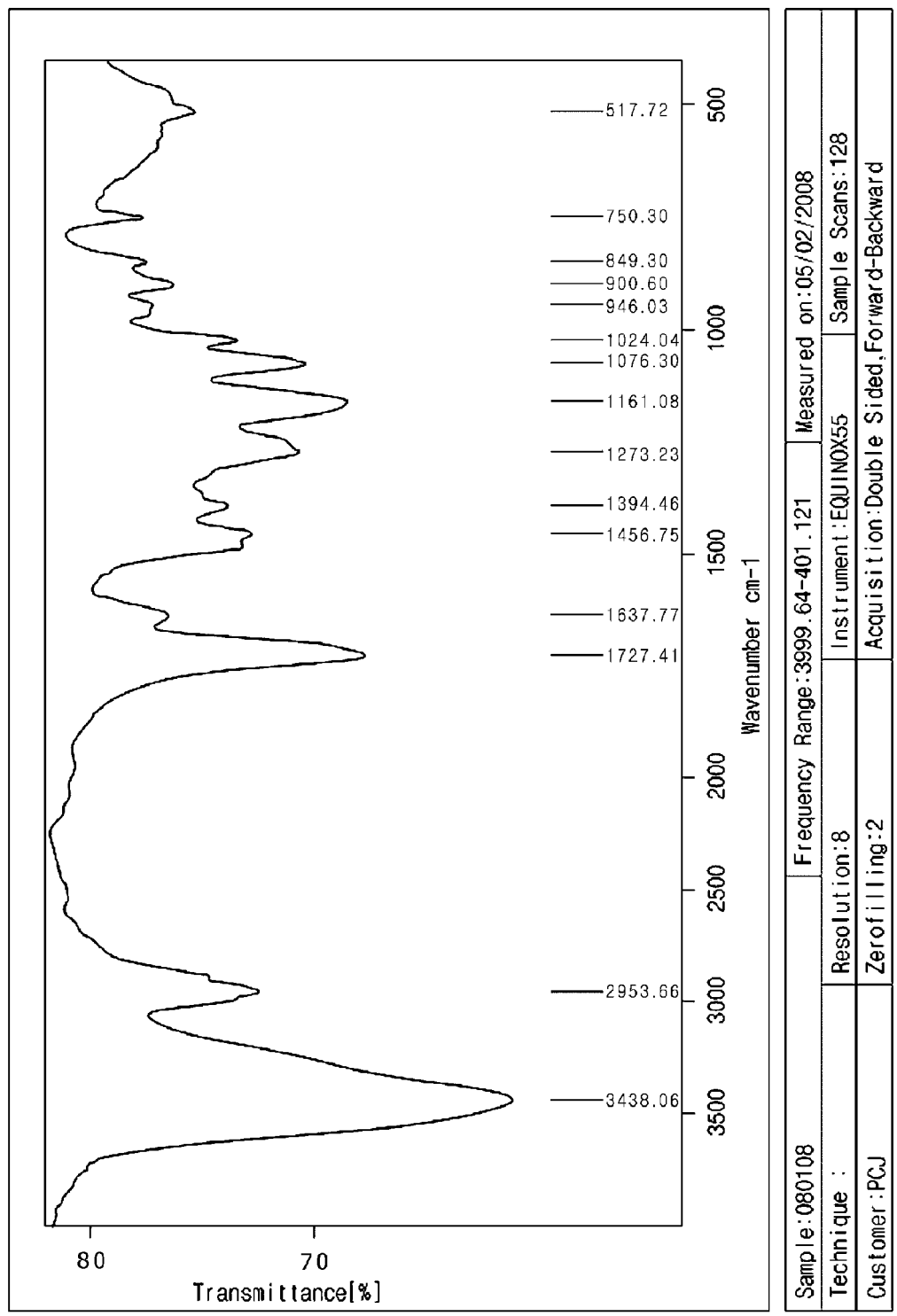
FIG. 2 is an IR spectrum of a contact lens prepared in Example 3.

In the meantime, an IR spectrum of a contact lens prepared in Comparative Example 2 and Example 3 is provided in FIGS. 1 and 2, respectively. FIGS. 1 and 2 shows that a contact lens comprising an oligosaccharide as an essential ingredient (Example 3) include a large amount of hydrophilic groups such as hydroxyl group compared to a contact lens comprising no oligosaccharide (Comparative Example 2).

INDUSTRIAL APPLICABILITY

As described above, a contact lens herein is a complex membrane prepared by crosslinking a lens composition which comprises an acryl monomer and an oligosaccharide as essential ingredients and optionally further comprises a silicone compound depending on the application. A lens herein is superior in wettability because hydrophilic functional groups are chemically bound onto the outer surface and intramolecular structure of a lens, thereby remarkably decreasing fatigue of eyes after the wearing for a long period of time. Moreover, the hydrophilic functional groups are chemically bound to a contact lens herein, and are not easily dissociated even by a washing solution, a care solution or storage solution. Therefore, a contact lens herein can replace a commercially available silicone hydrogel lens.

The invention claimed is:

1. A composition for a contact lens comprising:
    (a) an acryl monomer 30-99.99 wt %;
    (b) an oligosaccharide 0.01-70 wt %, the oligosaccharide selected from the group consisting of glucosamine, chondroitin, alginic acid, glucopyranoside, hyaluronan, or combinations thereof, wherein the composition has an interpenetrating polymer network (IPN) intra-structure; and
    (c) a crosslinking agent.

2. The composition for a contact lens of claim 1, which comprises:
    (a) an acryl monomer 30-99.98 wt %;
    (b) an oligosaccharide 0.01-20 wt %; and
    (c) a silicone compound 0.01-50 wt %.

3. The composition for a contact lens of claim 1, wherein the acryl monomer is selected from the group consisting of acrylic acid; methacrylic acid; acrylamide; $C_1$-$C_{15}$ saturated or unsaturated alkyl acrylate or methacrylate; $C_1$-$C_{15}$ hydroxyalkyl acrylate or methacrylate comprising 1-3 substituted hydroxylalkyl groups; N,N-di($C_1$-$C_{15}$ saturated or unsaturated alkyl)acrylamide and a mixture thereof.

4. The composition for a contact lens of claim 1, wherein the acryl monomer further comprises a hydrophilic monomer selected from the group consisting of N-vinylpyrrolidone (NVP) and N-methylpyrrolidone (NMP).

5. The composition for a contact lens of claim 1, wherein the oligosaccharide is substituted or unsubstituted with a hydrophilic group selected from the group consisting of hydroxy (—OH), carboxylic acid (—COOH), carboxylate (—COOR, R=$C_{1-6}$ alkyl), ketone (—CO—), aldehyde (—COH), amide (—NHCO—), alkanoate (RCOO—, R=$C_{1-6}$ alkyl) and hydroxymethyl (—$CH_2OH$) group.

6. The composition for a contact lens of claim 5, wherein the oligosaccharide has a viscosity of 30-20,000 cP.

7. The composition for a contact lens of claim 2, wherein a silicon (Si) atom of the silicone compound is substituted or unsubstituted with hydroxy, $C_1$-$C_{10}$ alkoxy, amide, ester or siloxy group.

8. The composition for a contact lens of claim 2, wherein the silicone compound is selected from the group consisting of 2-(trimethylsilyloxy)ethyl methacrylate, tris(3-methacryloxypropyl)silane, 3-tris(trimethylsiloxy)silyl propyl methacrylate and 4-methacryloxybutyl-terminated polydimethylsiloxane.

9. A hydrogel contact lens which is a complex membrane prepared by crosslinking the composition of claim 1.

10. A hydrogel contact lens of claim 9, which is a complex membrane having an IPN infra structure.

11. A hydrogel contact lens of claim 10, which has a tensile strength of 3-15 kg/$cm^2$, a water content of 30-75%, a wetting angle of 40-150° and an elasticity of 0.3-1.6 MPa.

12. The composition for a contact lens of claim 1, wherein the oligosaccharide is substituted with a hydrophilic group, wherein a ratio of hydrophilic substitute is 5 wt % to 100 wt % relative to the total weight of the oligosaccharide.

13. The composition for a contact lens of claim 12, wherein the ratio of hydrophilic substitute is 20 wt % to 100 wt % relative to the total weight of the oligosaccharide.

14. The composition for a contact lens of claim 4, wherein the hydrophilic monomer is used in an amount of 10 wt % to 30 wt %.

* * * * *